US012489658B2

(12) United States Patent
Raafat Hosny Mohamed Fahmy et al.

(10) Patent No.: US 12,489,658 B2
(45) Date of Patent: Dec. 2, 2025

(54) TONE ROTATION SELECTION

(71) Applicant: MaxLinear, Inc., Carlsbad, CA (US)

(72) Inventors: Ahmed Raafat Hosny Mohamed Fahmy, Valencia (ES); Salvador Iranzo Molinero, Bétera (ES); Antonio Arregui De La Cruz, Valencia (ES); Alejandro Victor Torrijo González, Valencia (ES)

(73) Assignee: MaxLinear, Inc., Carlsbad, CA (US)

( * ) Notice: Subject to any disclaimer, the term of this patent is extended or adjusted under 35 U.S.C. 154(b) by 119 days.

(21) Appl. No.: 18/363,669

(22) Filed: Aug. 1, 2023

(65) Prior Publication Data

US 2024/0039765 A1    Feb. 1, 2024

Related U.S. Application Data

(60) Provisional application No. 63/370,076, filed on Aug. 1, 2022.

(51) Int. Cl.
*H04L 25/02* (2006.01)
*H04L 5/00* (2006.01)

(52) U.S. Cl.
CPC ........ *H04L 25/0204* (2013.01); *H04L 5/0007* (2013.01); *H04L 25/022* (2013.01)

(58) Field of Classification Search
CPC .. H04L 25/0204; H04L 5/0007; H04L 25/022
See application file for complete search history.

(56) References Cited

U.S. PATENT DOCUMENTS

| 10,904,061 B2* | 1/2021 | Yang | H04L 27/2613 |
| 12,237,957 B2* | 2/2025 | Park | H04L 27/2603 |
| 2021/0320754 A1* | 10/2021 | Yun | H04L 27/261 |
| 2023/0155874 A1* | 5/2023 | Park | H04L 27/2613 |
| | | | 370/338 |

FOREIGN PATENT DOCUMENTS

WO    WO-2020045910 A1 *  3/2020  ......... H04L 27/2603

OTHER PUBLICATIONS

Mathworks "WLAN PPDU Structure" retrieved from site <https://www.mathworks.com/help/wlan/gs/wlan-ppdu-structure.html> Jul. 27, 2023.

* cited by examiner

*Primary Examiner* — Freshteh N Aghdam
(74) *Attorney, Agent, or Firm* — Buchalter; Jason W. Croft

(57) ABSTRACT

An access point may include a processing device configured to: identify a puncturing pattern for a channel width of a physical layer protocol data unit (PPDU) of a transmit signal; compute one or more tone rotation patterns using one or more tone rotation pattern parameters; and select a tone rotation pattern of the one or more tone rotation patterns based on the puncturing pattern for the channel width to minimize a peak to average power ratio (PAPR) of the transmit signal. The access point may include a transceiver configured to transmit the transmit signal to a wireless device based on the tone rotation pattern.

14 Claims, 12 Drawing Sheets

TONE ROTATION SELECTION

RELATED APPLICATION

This application claims the benefit of U.S. Provisional Application No. 63/370,076, filed Aug. 1, 2022, the disclosure of which is incorporated herein by reference in its entirety.

The examples discussed in the present disclosure are related to wireless communication, and in particular, to tone rotation selection.

BACKGROUND

Unless otherwise indicated herein, the materials described herein are not prior art to the claims in the present application and are not admitted to be prior art by inclusion in this section.

Wi-Fi® communications may be configured to occur in multiple frequency bands, including the 2.4 GHz, 5 GHz, and 6 GHz frequency bands.

The subject matter claimed in the present disclosure is not limited to examples that solve any disadvantages or that operate only in environments such as those described above. Rather, this background is only provided to illustrate one example technology area where some examples described in the present disclosure may be practiced.

SUMMARY

An access point may include a processing device configured to: identify a puncturing pattern for a channel width of a physical layer protocol data unit (PPDU) of a transmit signal; compute one or more tone rotation patterns using one or more tone rotation pattern parameters; and select a tone rotation pattern of the one or more tone rotation patterns based on the puncturing pattern for the channel width to minimize a peak to average power ratio (PAPR) of the transmit signal. The access point may include a transceiver configured to transmit the transmit signal to a wireless device based on the tone rotation pattern.

A station (STA) may include a processing device configured to: identify a puncturing pattern for a channel width of a physical layer protocol data unit (PPDU) of a transmit signal; compute one or more tone rotation patterns using one or more tone rotation pattern parameters; and select a tone rotation pattern based on the puncturing pattern for the channel width to minimize a peak to average power ratio (PAPR) of the transmit signal. The STA may include a transceiver configured to transmit the transmit signal to a wireless device based on the tone rotation pattern.

A method for wireless communication may comprise: computing, at the AP, a selection matrix based on a puncturing pattern; computing, at the AP, one or more tone rotation patterns using one or more tone rotation pattern parameters; computing, at the AP, using a projection of the one or more tone rotation patterns on the selection matrix, one or more projection vectors for the one or more tone rotation patterns based on the puncturing pattern, where the one or more projection vectors include one or more maximum values; and selecting, at the AP, a tone rotation pattern of the one or more tone rotation patterns to minimize the one or more maximum values.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Example extremely high throughput-physical layer protocol data unit (EHT-PPDU) fields may include pre-EHT modulated fields according to the Institute of Electrical and Electronics Engineers (IEEE) 802.11be standard. In the IEEE 802.11be extremely high throughput (EHT, WIFI-7) standard, the pre-EHT modulated fields shown in FIG. 1 have repetitive structure in the frequency domain that may lead to large peaks in time domain and, as a result, increase the peak to average power ratio (PAPR) of the orthogonal frequency-division multiplexing (OFDM) system.

However, in dynamic multi-user OFDMA scenario with preamble puncturing, the optimum tone rotation ($\varphi_1, \varphi_2, \varphi_3$) may different for each preamble puncturing pattern. The standard defines $9^4-1=6560$ preamble puncturing cases and, in theory, $2^{16}-1 = 65530$ preamble puncturing patterns can be obtained. Therefore, a dynamic method for efficient optimum tone rotation selection, based on the puncturing pattern, can be substantially beneficial to reduce the PAPR.

An access point may include a processing device configured to: identify a puncturing pattern for a channel width of a physical layer protocol data unit (PPDU) of a transmit signal; compute one or more tone rotation patterns using one or more tone rotation pattern parameters; and select a tone rotation pattern of the one or more tone rotation patterns based on the puncturing pattern for the channel width to minimize a peak to average power ratio (PAPR) of the transmit signal. The access point may include a transceiver configured to transmit the transmit signal to a wireless device based on the tone rotation pattern.

A station (STA) may include a processing device configured to: identify a puncturing pattern for a channel width of a physical layer protocol data unit (PPDU) of a transmit signal; compute one or more tone rotation patterns using one or more tone rotation pattern parameters; and select a tone rotation pattern based on the puncturing pattern for the channel width to minimize a peak to average power ratio (PAPR) of the transmit signal. The STA may include a transceiver configured to transmit the transmit signal to a wireless device based on the tone rotation pattern.

A method for wireless communication may comprise: computing, at the AP, a selection matrix based on a puncturing pattern; computing, at the AP, one or more tone rotation patterns using one or more tone rotation pattern parameters; computing, at the AP, using a projection of the one or more tone rotation patterns on the selection matrix, one or more projection vectors for the one or more tone rotation patterns based on the puncturing pattern, where the one or more projection vectors include one or more maximum values; and selecting, at the AP, a tone rotation pattern of the one or more tone rotation patterns to minimize the one or more maximum values.

Figure 1:
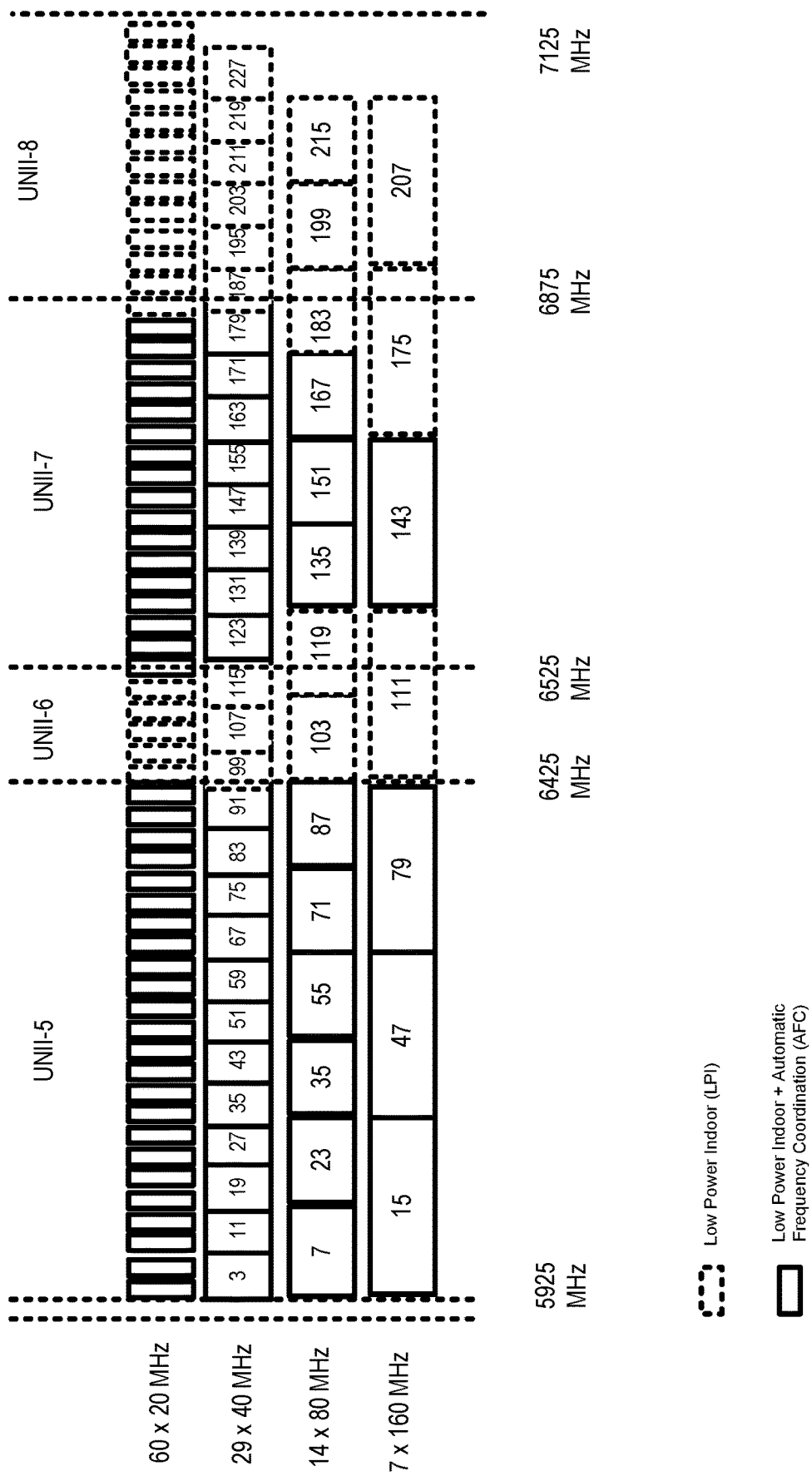
FIG. 1 illustrates an example extremely high throughput (EHT) physical layer protocol data unit (EHT-PPDU) fields.
Figure 2:
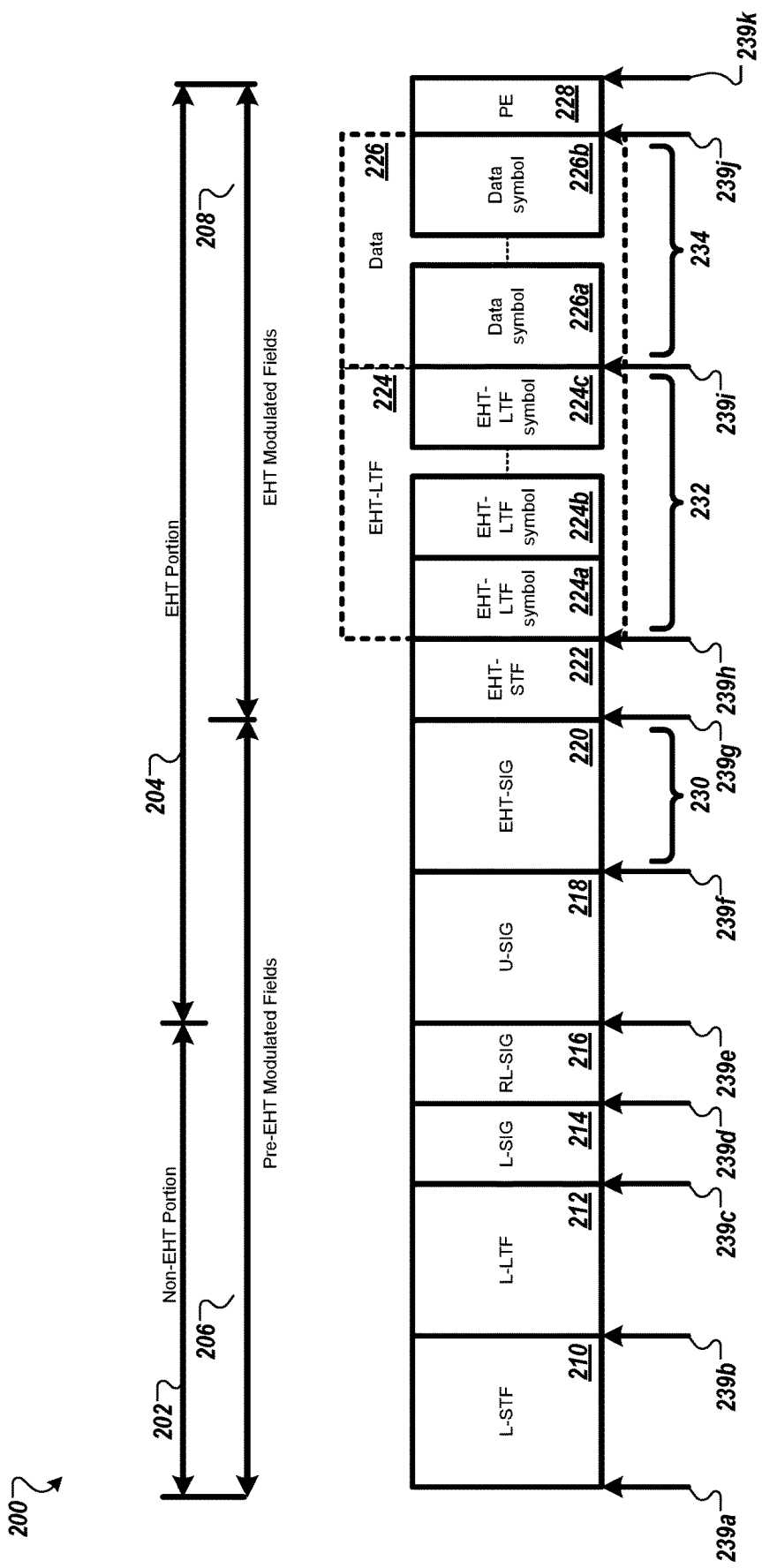
FIG. 2 illustrates example extremely high throughput (EHT) physical layer protocol data unit (EHT-PPDU) fields.

FIG. 1 illustrates an example of 6 GHz channels in the United States. When the channel bandwidth is 160 MHz, 7 different channels in the 6 GHz frequency band may be used including: channels 15, 47, and 79 in the UNII-5 sub-band; channel 111 in the UNII-6 and UNII-7 sub-bands; channels 143 in the UNII-7 sub-band; channel 175 in the UNII-7 and UNII-8 sub-bands; and channel 207 in the UNII-8 sub-band. Channels 15, 47, 79, and 143 may be operable in one or more of a low power indoor transmit power class and in a standard power class in coordination with an AFC server. Channels 111, 175, and 207 may be operable in a low power indoor transmit power class.

When the channel bandwidth is 80 MHz, 14 different channels in the 6 GHz frequency band may be used including: channels 7, 23, 39, 55, 71, and 87 in the UNII-5 sub-band; channel 103 in the UNII-6 sub-band; channel 119 in the UNII-6 and UNII-7 sub-bands; channels 135, 151, and 167 in the UNII-7 sub-band; channel 183 in the UNII-7 and UNII-8 sub-bands; channels 199 and 215 in the UNII-8 sub-bands. Channels 7, 23, 35, 55, 71, 87, 135, 151, and 167 may be operable in one or more of a low power indoor transmit power class and in a standard power class in coordination with an AFC server. Channels 103, 119, 183, 199, and 215 may be operable in a low power indoor transmit power class.

When the channel bandwidth is 40 MHz, 29 different channels in the 6 GHz frequency band may be used including: channels 3, 11, 19, 27, 35, 43, 51, 59, 67, 75, 83, and 91 in the UNII-5 frequency sub-band; channels 99 and 107 in the UNII-6 frequency sub-band; channel 115 in the UNII-6 and UNII-7 frequency sub-bands; channels 123, 131, 139, 147, 155, 163, 171, and 179 in the UNII-7 frequency sub-band; channel 187 in the UNII-7 and UNII-8 frequency sub-bands; channels 195, 203, 211, 219, and 227 in the UNII-8 frequency sub-band. Channels 3, 11, 19, 27, 35, 43, 51, 59, 67, 75, 83, 91, 123, 131, 139, 147, 155, 163, 171, and 179 may be operable in one or more of a low power indoor transmit power class and in a standard power class in coordination with an AFC server. Channels 99, 107, 115, 187, 195, 203, 211, 219, and 227 may be operable in a low power indoor transmit power class.

When the channel bandwidth is 20 MHz, 59 different channels in the 6 GHz frequency band may be used including: channels 1, 5, 9, 13, 17, 21, 25, 29, 33, 37, 41, 45, 49, 53, 57, 61, 65, 69, 73, 77, 81, 85, 89, and 93 in the UNII-5 frequency sub-band; channels 97, 101, 105, 109, and 113 in the UNII-6 frequency sub-band; channels 117, 121, 125, 129, 133, 137, 141, 145, 149, 153, 157, 161, 165, 169, 173, 177, and 181 in the UNII-7 frequency sub-band; channel 185 in the UNII-7 and UNII-8 frequency sub-bands; channels 189, 193, 197, 201, 205, 209, 213, 217, 221, 225, 229, and 233 in the UNII-8 frequency sub-band. Channels 1, 5, 9, 13, 17, 21, 25, 29, 33, 37, 41, 45, 49, 53, 57, 61, 65, 69, 73, 77, 81, 85, 89, 93, 117, 121, 125, 129, 133, 137, 141, 145, 149, 153, 157, 161, 165, 169, 173, 177, and 181 may be operable in one or more of a low power indoor transmit power class and in a standard power class in coordination with an AFC server. Channels 97, 101, 105, 109, 113, 185, 189, 193, 197, 201, 205, 209, 213, 217, 221, 225, 229, and 233 may be operable in a low power indoor transmit power class.

Embodiments of the present disclosure will be explained with reference to the accompanying drawings.

The access point may include a processing device and a transceiver. The transceiver may be configured to transmit a transmit signal to a wireless device (e.g., a station (STA), a user equipment (UE), or the like). The access point may be configured to transmit using an extremely high throughput (EHT) protocol 200 which may include one or more of a non-EHT portion 202 or an EHT portion 204. Alternatively or in addition, the access point may be configured to transmit using a non-high-throughput (non-HT) duplicate format.

The transmit signal may include one or more physical layer protocol data units (PPDUs) including one or more modulated fields which may include one or more pre-EHT modulated fields 206 or EHT modulated fields 208. The one or more pre-EHT modulated fields may include one or more of legacy short training field (L-STF) 210, legacy long training field (L-LTF) 212, legacy signal field (L-SIG) 214, repeated L-SIG (RL-SIG) 216, universal signal field (U-SIG) 218, EHT signal field (EHT-SIG) 220, or the like. The one or more EHT modulated fields may include EHT short training field (EHT-STF) 222, EHT long training field (EHT-LTF) 224, data field 226, packet extension field (PE) 228, or the like. The EHT-LTF 224 may include one or more EHT-LTF symbols (e.g., EHT-LTF symbol 224a, EHT-LTF symbol 224b, EHT-LTF symbol 224c, or the like). The data field 226 may include one or more data symbols (e.g., data symbol 226a, data symbol 226b, or the like). The one or more PPDUs may be configured to use a selected bandwidth (e.g., 20 MHz, 40 MHz, 80 MHz, 160 MHz, 320 MHz, or the like).

The transmit signal may include one or more PPDUs which may be non-HT format PPDUs. A non-HT format PPDU may include one or more of an L-STF, an L-LTF, an L-Sig, or a data field. The data filed may include one or more of service data (e.g., 16 bits), physical layer conformance procedure service data unit (PSDU), 6-$N_{es}$ Tail bits including 6 encoding stream tail bits, or pad bits.

The transmit signal may be transmitted using various transmission vector formats (e.g., EHT, non-HT duplicate format), various modulation formats (e.g., multi-user orthogonal frequency-division multiple access (OFDMA), orthogonal frequency division multiplexing (OFDM), direct sequence spread-spectrum complementary code keying (DSSS/CCK), or the like), or various 802.11 versions (e.g., 801.11b™, 802.11a™, 802.11j™, 802.11p™, 802.11g™, 802.11n (i.e., Wi-Fi® 4), 802.11ac (i.e., Wi-Fi® 5), 802.11ah, 802.11ad, 802.11ax (i.e., Wi-Fi® 6), 802.11ba, 802.11be (Wi-Fi® 7) or the like). The non-HT duplicate format transmission vector format may be transmitted using a duplicate transmission.

The duration for the one or more modulated fields may be provided as shown for an EHT multi-user (EHT-MU) transmission mode: (i) for L-STF 210, the duration between 239*a* and 239*b* may be e.g., 8 μs, (ii) for L-LTF 212, the duration between 239*b* and 239*c* may be e.g., 8 μs, (iii) for L-SIG 214, the duration between 239*c* and 239*d* may be e.g., 4 μs, (iv) for RL-SIG 216, the duration between 239*d* and 239*e* may be e.g., 4 μs, (v) for U-SIG 218, the duration between 239*e* and 239*f* may be e.g., 8 μs, (vi) for EHT-SIG 220, the duration between 239*f* and 239*g* may be e.g., 4 μs, (vii) for EHT-STF 222, the duration between 239*g* and 239*h* may be e.g., 4 μs, (viii) for EHT-LTF 224, the duration between 239*h* and 239*i* (i.e., the EHT-LTF duration 232) may be variable based on the number of EHT-LTF symbols 224*a*, 224*b*, 224*c*, (ix) for data field 226, the duration between 239*i* and 239*j* (i.e., the data field duration 234) may be variable based on the number of data symbols 226*a*, 226*b*, or (x) for PE field 228, the duration between 239*j* and 239*k* may be variable based on the number of PE field symbols. The duration for an EHT trigger based (EHT-TB) transmission mode may be the same as the duration for the EHT-MU transmission mode for the different PPDU fields except for the EHT-SIG field which may not be present in an EHT-TB transmission mode and except for the EHT-STF field which may be 8 μs in duration.

The duration for the one or more modulated fields for a non-HT format (e.g., for a duplicate transmission) may be variable based on bandwidth for one or more of the L-STF, the L-LTF, or the L-Sig. For channel bandwidths of 20, 40, 80, 160, or 320 MHz, the L-STF duration and/or the L-LTF duration may be 8 μs. For channel bandwidths of 10 MHz, the L-STF duration and/or the L-LTF duration may be 16 μs. For channel bandwidths of 5 MHz, the L-STF duration and/or the L-LTF duration may be 32 μs. For the L-Sig, the duration may be: (a) 4 μs for channel bandwidths of 20, 40, 80, or 160 MHz, (b) 8 μs for a channel bandwidth of 10 MHz, or (c) 16 μs for a channel bandwidth of 5 MHz.

The data portion for the non-HT format may be variable based on the size of the PSDU field (e.g., 1 to 4095 bytes). The service field may be 16 bits, the tail field may be 6 bits, and the pad bits may be variable to facilitate an integer number of symbols.

The power ratio (e.g., a PAPR) of the transmit pre-EHT modulated orthogonal frequency division multiplexing (OFDM) symbols may be enhanced using tone rotation (e.g., over a 20 MHz band). The tone rotation may be used for different PPDU transmissions including for one or more of a 20 MHz PPDU transmission, a 40 MHz PPDU transmission, an 80 MHz PPDU transmission, a 160 MHz PPDU transmission, or a 320 MHz PPDU transmission.

Figure 3:
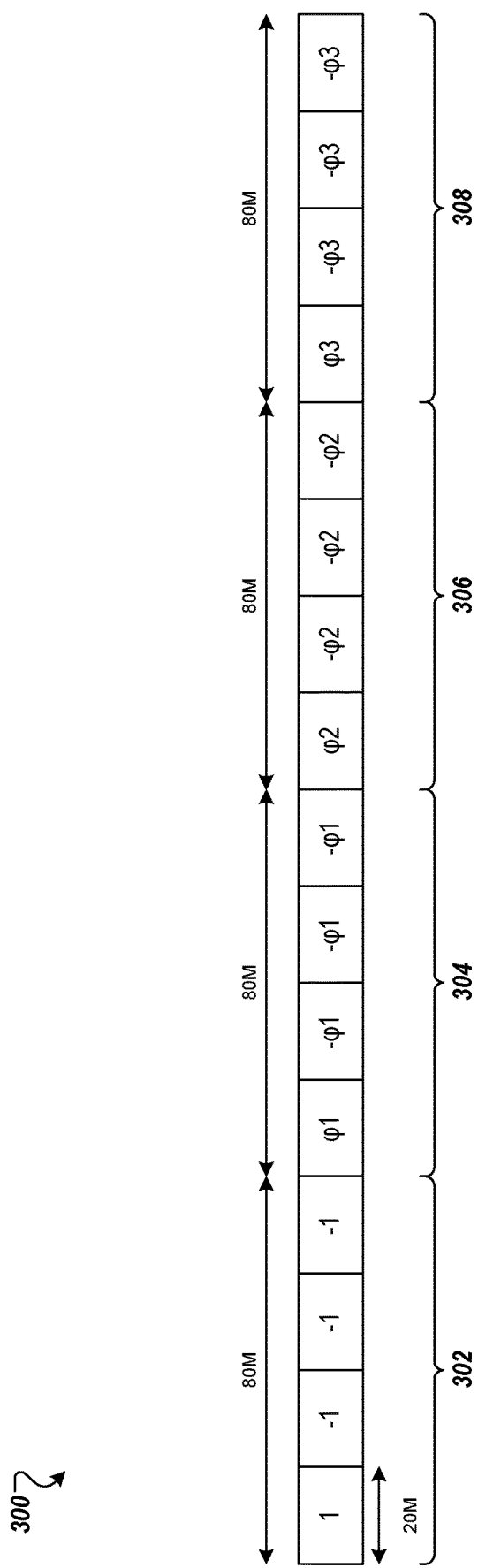
FIG. 3 illustrates example tone rotation structure for pre-EHT modulated fields.
Figure 4:
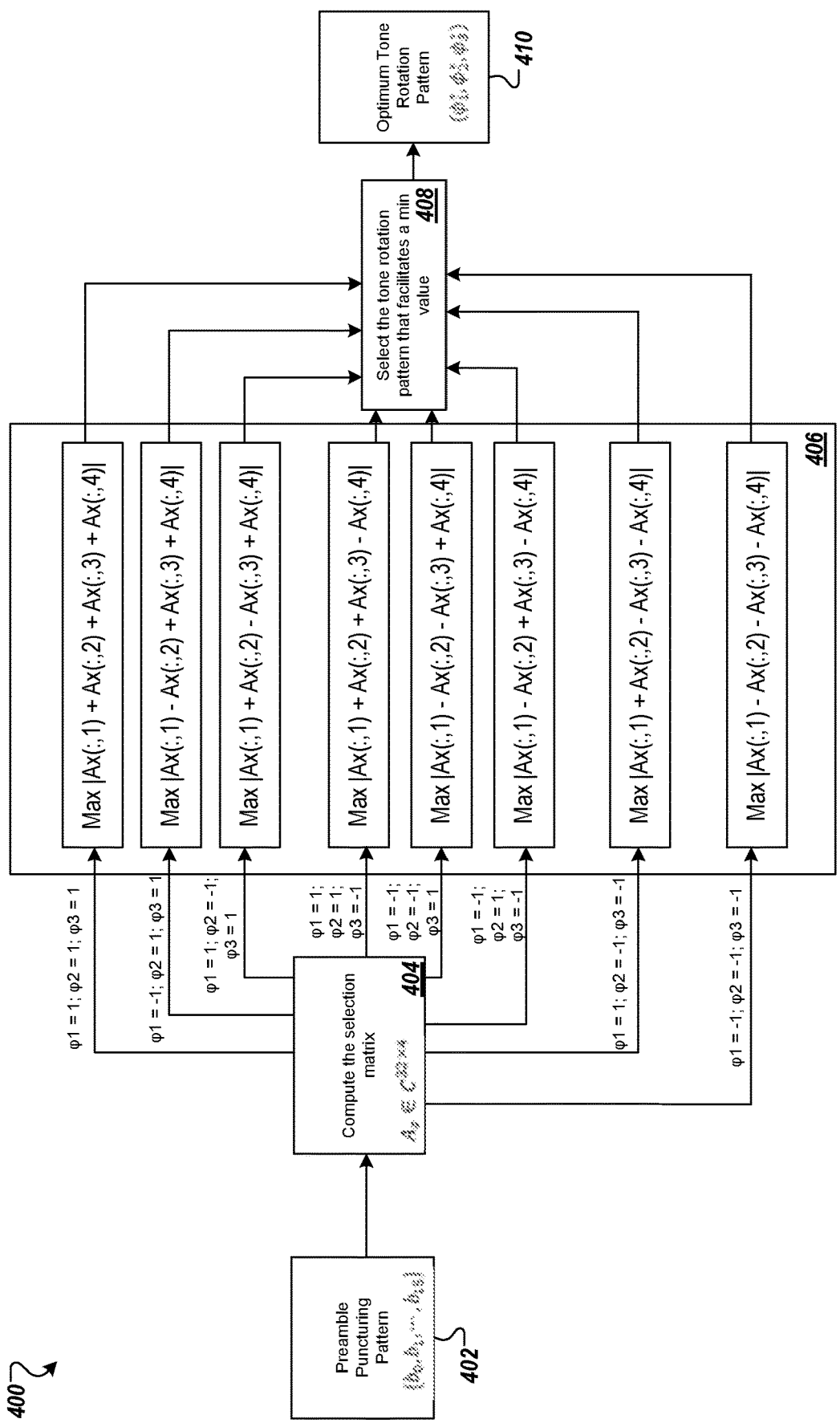
FIG. 4 illustrates example tone rotation selection.

As illustrated in FIG. 3, the one or more preamble symbols in a transmission signal may have 64 binary phase shift keying (BPSK) bins (e.g., for a 20 MHz signal) which may be repeated to span a selected spectrum size (e.g., a 320 MHz spectrum). The signal may be rotated according to the tone rotation pattern 300 illustrated in FIG. 3 in which ($\phi_1$, $\phi_2$, $\phi_3$) may be +1 or −1. This tone rotation pattern 300 may reduce the power ratio (e.g., a PAPR) of one or more of the pre-EHT modulated OFDM symbols (when the transmission mode is EHT) or the non-data portion (e.g., the L-STF, the L-LTF, or the L-Sig) for a non-HT format duplicate transmission. Equation 1 (Eq. 1) provides example values that may be applied to the kth subcarrier for a bandwidth of e.g., 320 MHz.

$$\gamma_{k,320} = \begin{cases} 1, & k < -448 \\ -1, & -448 \le k < -256 \\ \varphi_1, & -256 \le k < -192 \\ -\varphi_1, & -192 \le k < 0 \\ \varphi_2, & 0 \le k < 64 \\ -\varphi_2, & 64 \le k < 256 \\ \varphi_3, & 256 \le k < 320 \\ -\varphi_3, & k \ge 320 \end{cases} \quad \text{(Equation 1)}$$

In equation 1, the tone rotation pattern parameters (e.g., $\varphi_1$, $\varphi_2$, $\varphi_3$) may vary based on the selected 80 MHz sub-block rotation coefficient using a value of +1 and −1.

A device (e.g., an AP, a STA, a UE, or the like) may include a processor that may be configured to compute one or more tone rotation patterns 300 using one or more tone rotation pattern parameters (e.g., $\varphi_1$, $\varphi_2$, $\varphi_3$). The tone rotation pattern 300 may be adjusted based on a channel width (e.g., a channel bandwidth). The channel width (e.g., channel bandwidth) may be 320 MHz.

The one or more tone rotation pattern parameters (e.g., $\varphi_1$, $\varphi_2$, $\varphi_3$) may be based on an 80 MHz sub-block rotation coefficient. The tone rotation pattern 300 may include four MHz sub-blocks. A first 80 MHz sub-block 302 may include four values for the tone rotation pattern 300 including [1, −1, −1, −1]. The second 80 MHz sub-block 304 may include four values for the tone rotation pattern 300 including [$\varphi_1$, −$\varphi_1$, −$\varphi_1$, −$\varphi_1$]. The third 80 MHz sub-block 306 may include four values for the tone rotation pattern 300 including [$\varphi_2$, −$\varphi_2$, −$\varphi_2$, −$\varphi_2$]. The fourth 80 MHz sub-block 308 may include four values for the tone rotation pattern 300 including [$\varphi_3$, −$\varphi_3$, −$\varphi_3$, −$\varphi_3$].

The tone rotation pattern parameters may have 8 different permutations as provided in Table 1.

TABLE 1

| Tone Rotations | | | | | | | | |
|---|---|---|---|---|---|---|---|---|
| Tone rotation | option 1 | option 2 | option 3 | option 4 | option 5 | option 6 | option 7 | option 8 |
| $\varphi_1$ | 1 | 1 | 1 | 1 | −1 | −1 | −1 | −1 |
| $\varphi_2$ | 1 | 1 | −1 | −1 | 1 | 1 | −1 | −1 |
| $\varphi_3$ | 1 | −1 | 1 | −1 | 1 | −1 | 1 | −1 |

For transmissions without using preamble puncturing, the lowest power ratio (e.g., a PAPR) may be computed by simulating the different permutations for the tone rotation pattern parameters ($\varphi1$, $\varphi2$, $\varphi3$) shown in Table 1.

Based on the 8 different permutations provided in Table 1, a power ratio (e.g., a PAPR) may be computed for different preamble puncturing patterns that may be computed using different values of $b_0$–$b_{15}$ in which $b_k \in \{0, 1\}$. When $b_k=0$, the corresponding 20 MHz band may be punctured out of the spectrum. For example, when $b_0=0$, the band from −160 MHz to −140 MHz may be punctured, and when $b_{15}=0$, the band from 140 MHz to 160 MHz may be punctured.

A device (e.g., an AP, a STA, a UE, or the like) may include a processor that may be configured to identify a puncturing pattern (e.g., a preamble puncturing pattern) for a channel width of a physical layer protocol data unit (PPDU) of a transmit signal. The puncturing pattern (e.g., a preamble puncturing pattern), as shown in operation 402, may be used to compute a selection matrix, as shown in operation 404. The processor may be configured to compute one or more tone rotation patterns using the one or more tone rotation pattern parameters (e.g., ($\varphi1$, $\varphi2$, $\varphi3$)), as shown in operation 406. The processor may be configured to select a tone rotation pattern that facilitates a minimum value, as shown in operation 408. An optimum tone rotation pattern may be computed, as shown in operation 410. The optimum tone rotation pattern may be a tone rotation pattern of the one or more tone rotation patterns based on the puncturing pattern for the channel width that may be computed to minimize a power ratio (e.g., a PAPR) of the transmit signal.

The processor may be configured to compute a selection matrix, e.g., ($A_s$), based on the puncturing pattern. The selection matrix may include a selected number of rows and a selected number of columns (e.g., 32 rows and 4 columns) in which a column may be a linear combination of the selected number of sub-columns, k (e.g., four sub-columns). The $k^{th}$ sub-column of the selection matrix may be a function on $b_k$. That is, the selection matrix ($A_s$) may be computed using:

$$A_s = A_s(1, 1:4) = [b_0 w_{00}^0 - b_1 w_{01}^0 - b_2 w_{02}^0 - b_3 w_{03}^0 \mid b_4 w_{10}^0 -$$
$$b_5 w_{11}^0 - b_6 w_{12}^0 - b_7 w_{13}^0 \mid b_8 w_{20}^0 - b_9 w_{21}^0 - b_{10} w_{22}^0 -$$
$$b_{11} w_{23}^0 \mid b_{12} w_{30}^0 \mid b_{12} w_{30}^0 - b_{13} w_{31}^0 - b_{14} w_{32}^0 - b_{15} w_{33}^0]$$
$$A_s(2, 1:4) = [b_0 w_{00}^1 - b_1 w_{01}^1 - b_2 w_{02}^1 - b_3 w_{03}^1 \mid b_4 w_{10}^1 -$$
$$b_5 w_{11}^1 - b_6 w_{12}^1 - b_7 w_{13}^1 \mid b_8 w_{20}^1 - b_9 w_{21}^1 - b_{10} w_{22}^1 -$$
$$b_{11} w_{23}^1 \mid b_{12} w_{30}^1 - b_{13} w_{13}^1 - b_{14} w_{32}^1 - b_{15} w_{33}^1]$$
$$\vdots$$
$$A_s(32, 1:4) = [b_0 w_{00}^{32} - b_1 w_{01}^{32} - b_2 w_{02}^{32} -$$
$$b_3 w_{03}^{32} \mid b_4 w_{10}^{32} - b_5 w_{11}^{32} - b_6 w_{12}^{32} - b_7 w_{13}^{32} \mid b_8 w_{20}^{32} -$$
$$b_9 w_{21}^{32} - b_{10} w_{22}^{32} - b_{11} w_{23}^{32} \mid b_{12} w_{30}^{32} - b_{13} w_{31}^{32} - b_{14} w_{32}^{32} - b_{15} w_{33}^{32}]$$

where $$w00 = e^{i2\pi(-8)\left(\frac{64}{2048}\right)}; w01 = e^{i2\pi(-7)\left(\frac{64}{2048}\right)};$$
$$w02 = e^{i2\pi(-6)\left(\frac{64}{2048}\right)}; w03 = e^{i2\pi(-5)\left(\frac{64}{2048}\right)}$$
$$w10 = e^{i2\pi(-4)\left(\frac{64}{2048}\right)}; w11 = e^{i2\pi(-3)\left(\frac{64}{2048}\right)};$$
$$w12 \; e^{i2\pi(-2)\left(\frac{64}{2048}\right)}; w13 e^{i2\pi(-1)\left(\frac{64}{2048}\right)}$$
$$w20 = e^{i2\pi(0)\left(\frac{64}{2048}\right)}; w21 = e^{i2\pi(1)\left(\frac{64}{2048}\right)};$$
$$w22 = e^{i2\pi(2)\left(\frac{64}{2048}\right)}; w23 = e^{i2\pi(3)\left(\frac{64}{2048}\right)}$$
$$w30 = e^{i2\pi(4)\left(\frac{64}{2048}\right)}; w31 = e^{i2\pi(5)\left(\frac{64}{2048}\right)};$$
$$w32 = e^{i2\pi(6)\left(\frac{64}{2048}\right)}; w33 = e^{i2\pi(7)\left(\frac{64}{2048}\right)}.$$

A reference signal in a part of the spectrum from 0 to 20 MHz may have a time-domain representation computed as:

$$x_t = \frac{1}{\sqrt{N}} F x_{20},$$

where $F \in C^{2048 \times 2048}$ may be the first 64 columns of the inverse discrete Fourier transform (IDFT) matrix of size 2048, $x_{20} \in C^{64 \times 1}$ may be 64 BPSK bins, and $x_t \in C^{2048 \times 1}$ may be the time domain signal equivalent for the part of the spectrum from 0 to 20 MHz, and N=2048.

For a tone rotation pattern (e.g., $\phi_p = [1, -1, -1, -1, \phi_1, \phi_1, -\phi_1, -\phi_1, \phi_2, -_2, -\phi_2, -\phi_2, \phi_3, -\phi_3, -\phi_3, -\phi_3]$), a transmit signal using the tone rotation pattern may be expressed as a projected vector for the tone rotation pattern, e.g., using $$x_t = \frac{1}{\sqrt{N}} \left( \sum_{k=-8}^{7} \text{diag}\left(e^{1i \times 2pi(0:\ 2047) * 64 * \frac{(k)}{2048}}\right) \phi_p(k+9) \right) F x_{20}.$$

The transmit signal using the tone rotation pattern may be expressed using, e.g., a puncturing pattern, e.g., $b = [b_0, b_1, b_2, b_3, b_4, b_5, b_6, b_7, b_8, b_9, b_{10}, b_{11}, b_{12}, b_{13}, b_{14}, b_{15}]$, where $$b_k = \begin{cases} 1, & \text{the } k^{th} \text{ 20 MHz exists} \\ 0, & \text{the } k^{th} \text{ 20 MHz is puct} \end{cases}$$

When a puncturing pattern is used with the transmit signal having a tone rotation pattern, the transmit signal may be a punctured transmit signal, e.g., expressed as $$x_t = \frac{1}{\sqrt{N}} \left( \sum_{k=-8}^{7} \text{diag}\left(e^{1i \times 2pi(0:\ 2047) * 64 * \frac{(k)}{2048}}\right) \phi_p(k+9) b(k+9) \right) F x_{20},$$

which may be written as:

$$x_t = \frac{1}{\sqrt{N}} \left( \sum_{k=-8}^{-5} \text{diag}\left(e^{1i \times 2pi(0:\ 2047) * 64 * \frac{(k)}{2048}}\right) b(k+9) + \right.$$
$$\phi_1 \sum_{k=-4}^{-1} \text{diag}\left(e^{1i \times 2pi(0:\ 2047) * 64 * \frac{(k)}{2048}}\right) b(k+9) +$$
$$\phi_2 \sum_{k=0}^{3} \text{diag}\left(e^{1i \times 2pi(0:\ 2047) * 64 * \frac{(k)}{2048}}\right) b(k+9) +$$
$$\left. \phi_3 \sum_{k=4}^{7} \text{diag}\left(e^{1i \times 2pi(0:\ 2047) * 64 * \frac{(k)}{2048}}\right) b(k+9) \right) F x_{20}.$$

That is, the punctured transmit signal may be expressed using, e.g., $$x_t = \frac{1}{\sqrt{N}} \text{diag}(A_s \phi) F x_{20},$$

where $A_s$ may be the selection matrix and $\phi$ may be expressed as, e.g., $[1, \phi_1, \phi_2, \phi_3]^T$.

The processor may be configured to compute the maximum value of the projected vector per each tone max ($|A_s[1 \; \phi_1 \; \phi_2 \; \phi_3]^T|$) for a transmit signal (e.g., a punctured transmit signal). A power ratio (e.g., a PAPR) of the transmit signal (e.g., a punctured transmit signal) may be minimized based on the selection matrix (e.g., $A_s$) and the one or more tone rotation pattern parameters (e.g., ($\phi$1, $\phi$2, $\phi$3)).

The processor may be configured to compute the power ratio (e.g., a PAPR) of the transmit signal (e.g., a punctured transmit signal) by using a projection of the one or more tone rotation patterns (e.g., as computed using the one or more tone rotation pattern parameters, e.g., ($\phi$1, $\phi$2, $\phi$3)) on the selection matrix (e.g., $A_s$) to compute one or more projection vectors (e.g., $|A_s[1 \; \phi_1 \; \phi_2 \; \phi_3]^T|$) for one or more tone rotation patterns based on the puncturing pattern.

A processor may be configured to compute the maximum values for the one or more projection vectors. Based on the maximum values for the one or more projection vectors, a processor may be configured to compute minimized maximum values for the one or more projection vectors. The processor may be configured to select a tone rotation based on the minimized maximum values for the one or more projection vectors. The optimum tone rotation that minimizes the power ratio (e.g., a PAPR) may be the tone rotation that minimizes the max values of the one or more projection vectors. The optimum tone rotation may be selected to minimize the maximum values for the input puncturing pattern. When multiple tone rotations reduce the power ratio (e.g., the PAPR), a tone rotation may be selected when the selected tone rotation may not provide the highest magnitude of power ratio (e.g., PAPR) reduction.

One or more of the rows or the columns of the selection matrix may be periodic to facilitate one or more of a performance increase, a computational complexity reduction, or a computation time reduction compared to a baseline performance, computational complexity, or computation time in which the rows and/or the columns of the selection matrix are not periodic. Using the periodicity of the rows and/or columns of the selection matrix may facilitate computations using a selected number of rows and/or columns of the selection matrix that may include a subset of the total number of rows and/or columns of the selection matrix. For example, when the rows of the selection matrix are periodic after 32 rows, then computations may be performed using 32 rows instead of the total number of rows (e.g., which may be 2048 rows).

The tone rotation pattern may be a phase rotation pattern. For a selected channel width (e.g., for a 320 MHz PPDU transmission), the tone rotation pattern parameters (e.g., e.g., ($\phi$1, $\phi$2, $\phi$3)) may vary based on an selected sub-block rotation coefficient value (e.g., an 80 MHz sub-block rotation coefficient value of +1 or −1). The 320 MHz phase rotations may include one or more of: Equation 2 or Equation 3 as disclosed:

$$\gamma_{k,320} = \begin{cases} 1, & k < -448 \\ -1, & -448 \leq k < -256 \\ 1, & -256 \leq k < -192 \\ -1, & -192 \leq k < 0 \\ -1, & 0 \leq k < 64 \\ 1, & 64 \leq k < 256 \\ -1, & 256 \leq k < 320 \\ 1 & k \geq 320 \end{cases} \quad \text{(Equation 2)}$$

$$\text{and } \gamma_{k,320} = \begin{cases} 1, & k < -448 \\ -1, & -448 \leq k < -256 \\ 1, & -256 \leq k < -192 \\ -1, & -192 \leq k < 0 \\ 1, & 0 \leq k < 64 \\ -1, & 64 \leq k < 256 \\ -1, & 256 \leq k < 320 \\ 1 & k \geq 320 \end{cases} \quad \text{(Equation 3)}$$

A processor may be configured to update the tone rotation pattern based on one or more of: receiving an updated puncturing pattern, a random variable, or a selected interval. The optimum tone rotation determination (calculation) may be repeated when new puncturing information is obtained. The optimum tone rotation method may be repeated randomly. The optimum tone rotation method may be based on a predetermined interval time.

Figure 5:
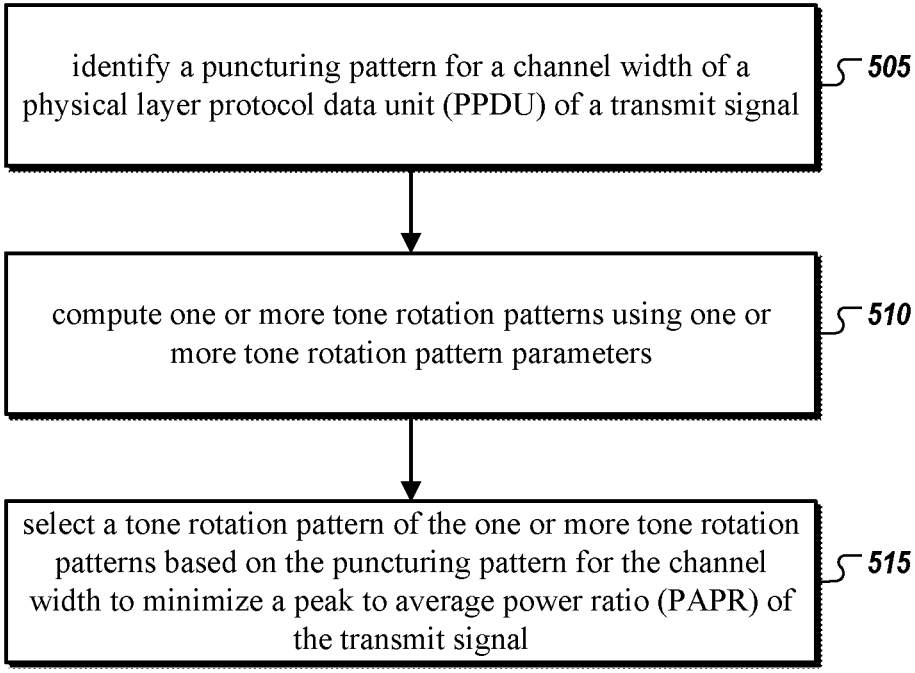
FIG. 5 illustrates an example process flow of an access point (AP) configured for tone rotation selection.

FIG. 5 illustrates a process flow of an example method 500 of AP interference reduction, in accordance with at least one example described in the present disclosure. The method 500 may be arranged in accordance with at least one example described in the present disclosure.

Figure 8:
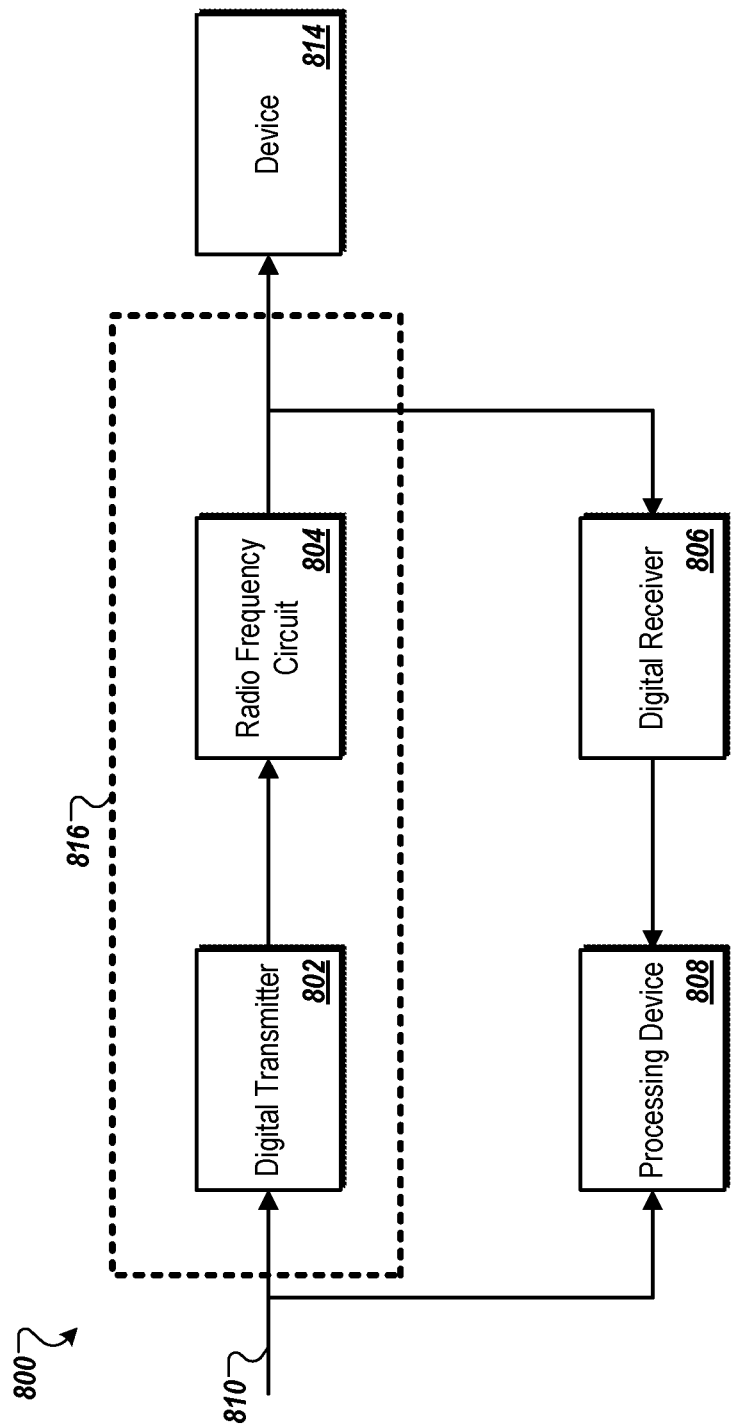
FIG. 8 illustrates an example communication system configured for tone rotation selection.
Figure 9:
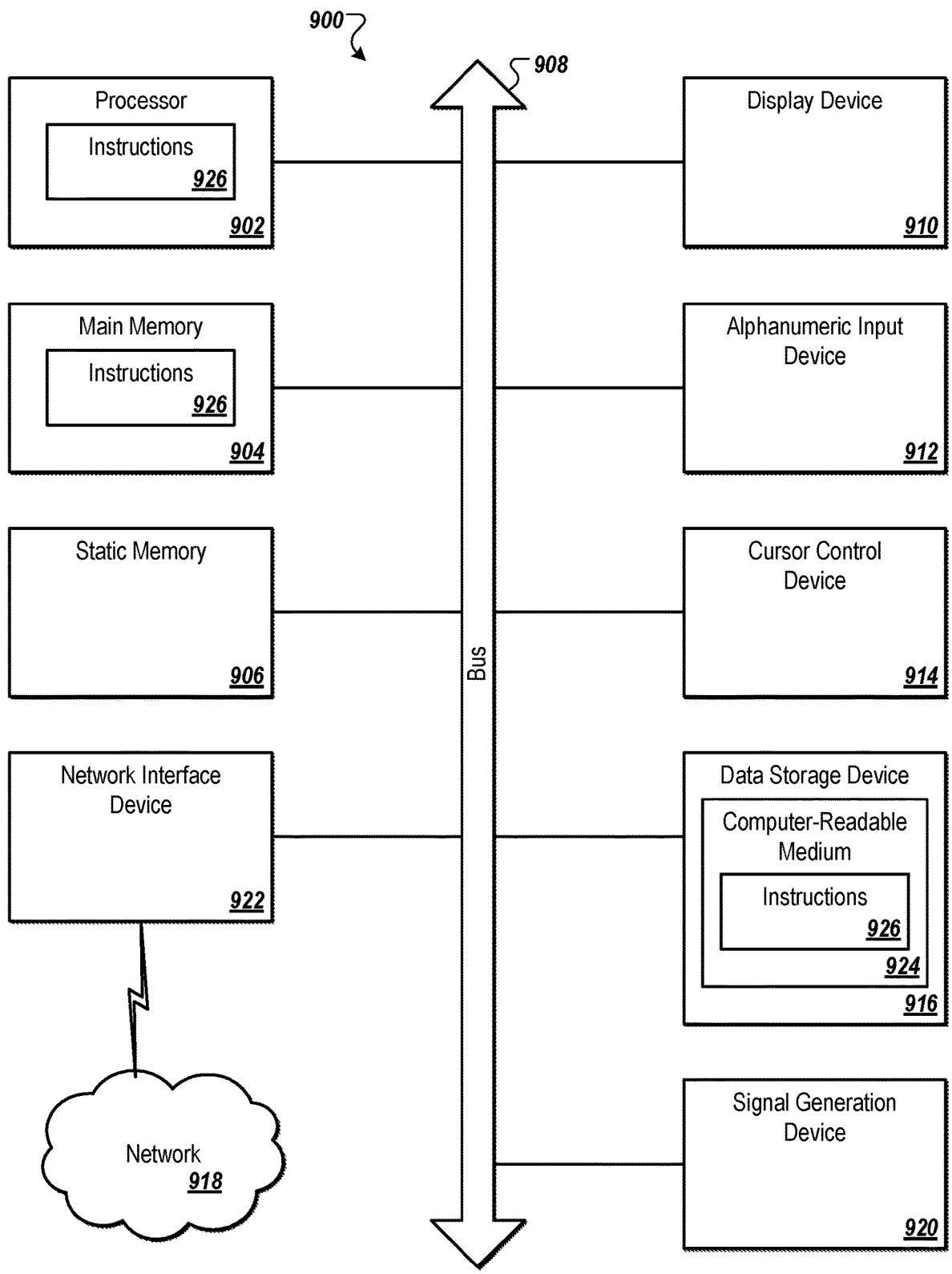
FIG. 9 illustrates a diagrammatic representation of a machine in the example form of a computing device within which a set of instructions, for causing the machine to perform any one or more of the methods discussed herein, may be executed.

The method 500 may be performed by processing logic that may include hardware (circuitry, dedicated logic, etc.), software (such as is run on a computer system or a dedicated machine), or a combination of both, which processing logic may be included in the processor 902 of FIG. 9, the communication system 800 of FIG. 8, or another device, combination of devices, or systems.

The method 500 may begin at block 505 where the processing logic may identify a puncturing pattern for a channel width of a physical layer protocol data unit (PPDU) of a transmit signal.

At block 510, the processing logic may compute one or more tone rotation patterns using one or more tone rotation pattern parameters.

At block 515, the processing logic may select a tone rotation pattern of the one or more tone rotation patterns based on the puncturing pattern for the channel width to minimize a peak to average power ratio (PAPR) of the transmit signal.

Modifications, additions, or omissions may be made to the method 500 without departing from the scope of the present disclosure. For example, in some examples, the method 500 may include any number of other components that may not be explicitly illustrated or described.

Figure 6:
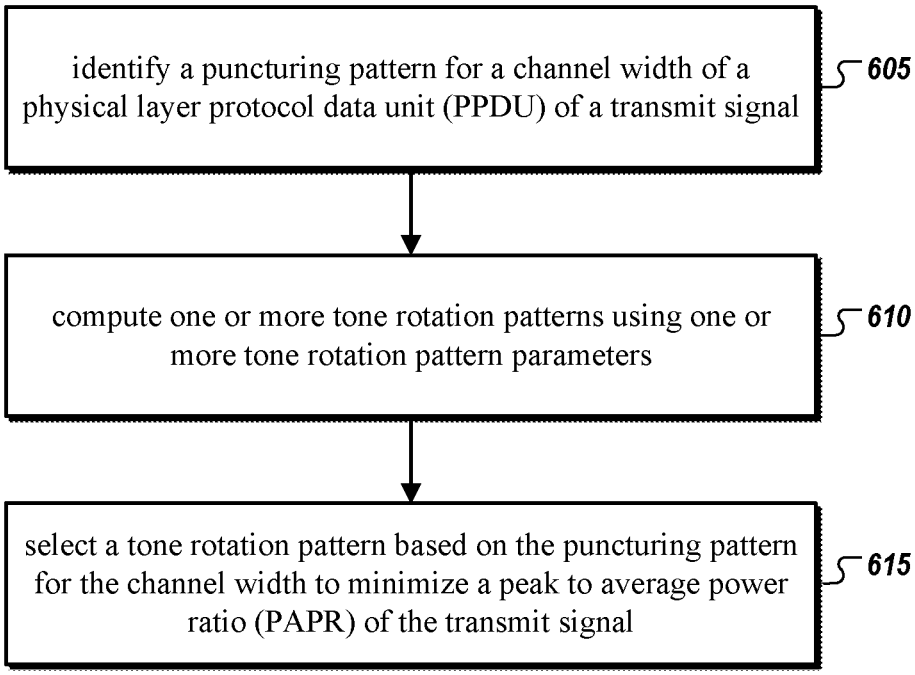
FIG. 6 illustrates an example process flow of a station (STA) configured for tone rotation selection.

FIG. 6 illustrates a process flow of an example method 600 that may be used for AP interference reduction, in accordance with at least one example described in the present disclosure. The method 600 may be arranged in accordance with at least one example described in the present disclosure.

The method 600 may be performed by processing logic that may include hardware (circuitry, dedicated logic, etc.), software (such as is run on a computer system or a dedicated machine), or a combination of both, which processing logic may be included in the processing device 902 of FIG. 9, the communication system 800 of FIG. 8, or another device, combination of devices, or systems.

The method 600 may begin at block 605 where the processing logic identify a puncturing pattern for a channel width of a physical layer protocol data unit (PPDU) of a transmit signal.

At block 610, the processing logic may compute one or more tone rotation patterns using one or more tone rotation pattern parameters.

At block 615, the processing logic may select a tone rotation pattern based on the puncturing pattern for the channel width to minimize a peak to average power ratio (PAPR) of the transmit signal.

Modifications, additions, or omissions may be made to the method 600 without departing from the scope of the present disclosure. For example, in some examples, the method 600 may include any number of other components that may not be explicitly illustrated or described.

Figure 7:
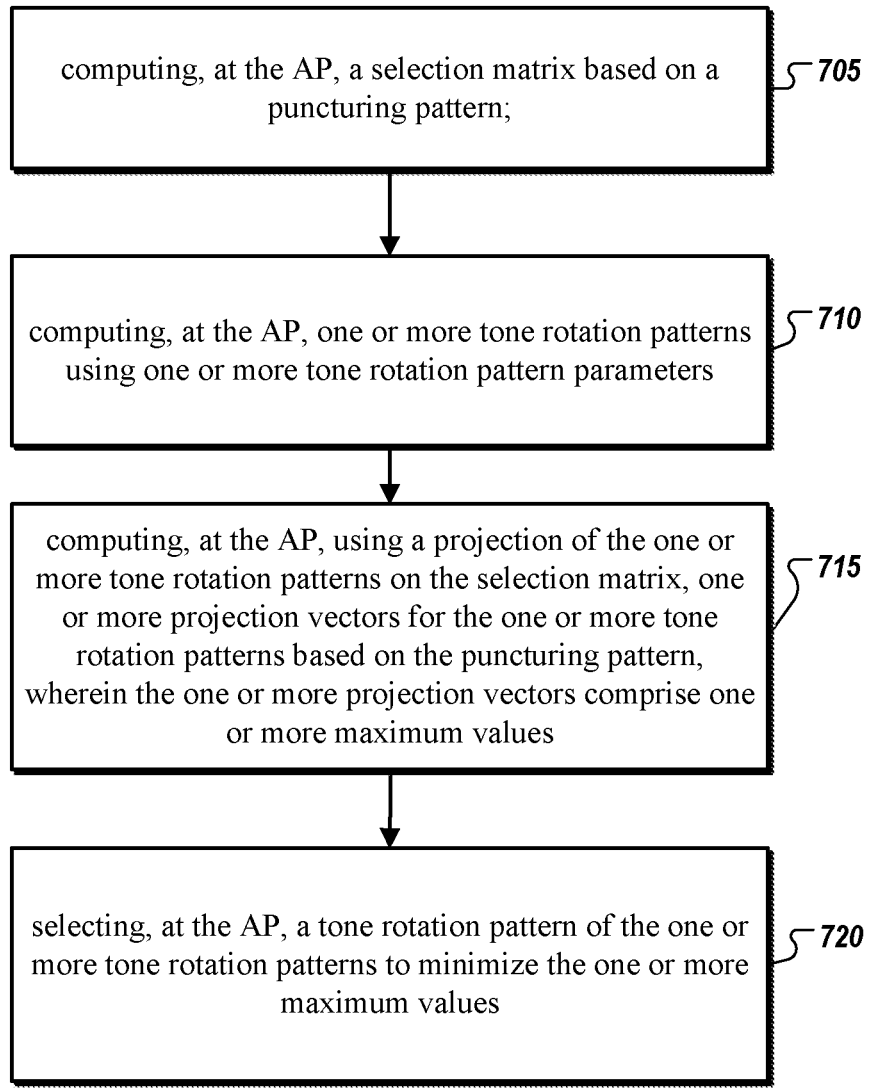
FIG. 7 illustrates an example process flow of tone rotation selection.

FIG. 7 illustrates a process flow of an example method 700 that may be used for tone rotation selection in accordance with at least one example described in the present disclosure. The method 700 may be arranged in accordance with at least one example described in the present disclosure.

The method 700 may be performed by processing logic that may include hardware (circuitry, dedicated logic, etc.), software (such as is run on a computer system or a dedicated machine), or a combination of both, which processing logic may be included in the processing device 902 of FIG. 9, the communication system 800 of FIG. 8, or another device, combination of devices, or systems.

The method 700 may begin at block 1005 where the processing logic may include computing, at the AP, a selection matrix based on a puncturing pattern.

At block 710, the processing logic may include computing, at the AP, one or more tone rotation patterns using one or more tone rotation pattern parameters.

At block 715, the processing logic may include computing, at the AP, using a projection of the one or more tone rotation patterns on the selection matrix, one or more projection vectors for the one or more tone rotation patterns based on the puncturing pattern, where the one or more projection vectors include one or more maximum values.

At block 720, the processing logic may include selecting, at the AP, a tone rotation pattern of the one or more tone rotation patterns to minimize the one or more maximum values.

The method may include one or more of: computing, at the AP, a selection matrix based on a puncturing pattern; computing, at the AP, one or more tone rotation patterns using one or more tone rotation pattern parameters; computing, at the AP, using a projection of the selection matrix, one or more projection vectors for the one or more tone rotation patterns based on the puncturing pattern, where the one or more projection vectors include one or more maximum values; selecting, at the AP, a tone rotation pattern of the one or more tone rotation patterns to minimize the one or more maximum values; minimizing a peak to average power ratio (PAPR) for a transmit signal based on the selection matrix and the one or more tone rotation pattern parameters; reducing a peak to average power ratio (PAPR) for a transmit signal when using the tone rotation pattern compared to a fixed tone rotation PAPR; maintaining a performance for the transmit signal when using tone rotation pattern compared to a fixed tone rotation performance Modifications, additions, or omissions may be made to the method 700 without departing from the scope of the present disclosure. For example, in some examples, the method 700 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 8 illustrates a block diagram of an example communication system 800 in accordance with at least one example described in the present disclosure. The communication system 800 may include a digital transmitter 802, a radio frequency circuit 804, a device 814, a digital receiver 806, and a processing device 808. The digital transmitter 802 and the processing device may be configured to receive a baseband signal via connection 810. A transceiver 816 may include the digital transmitter 802 and the radio frequency circuit 804.

In some examples, the communication system 800 may include a system of devices that may be configured to communicate with one another via a wired or wireline connection. For example, a wired connection in the communication system 800 may include one or more Ethernet cables, one or more fiber-optic cables, and/or other similar wired communication mediums. Alternatively, or additionally, the communication system 800 may include a system of devices that may be configured to communicate via one or more wireless connections. For example, the communication system 800 may include one or more devices configured to transmit and/or receive radio waves, microwaves, ultrasonic waves, optical waves, electromagnetic induction, and/or similar wireless communications. Alternatively, or additionally, the communication system 800 may include combinations of wireless and/or wired connections. In these and other examples, the communication system 800 may include one or more devices that may be configured to obtain a baseband signal, perform one or more operations to the baseband signal to generate a modified baseband signal, and transmit the modified baseband signal, such as to one or more loads.

In some examples, the communication system 800 may include one or more communication channels that may communicatively couple systems and/or devices included in the communication system 800. For example, the transceiver 816 may be communicatively coupled to the device 814.

In some examples, the transceiver 816 may be configured to obtain a baseband signal. For example, as described herein, the transceiver 816 may be configured to generate a baseband signal and/or receive a baseband signal from another device. In some examples, the transceiver 816 may be configured to transmit the baseband signal. For example, upon obtaining the baseband signal, the transceiver 816 may be configured to transmit the baseband signal to a separate device, such as the device 814. Alternatively, or additionally, the transceiver 816 may be configured to modify, condition, and/or transform the baseband signal in advance of transmitting the baseband signal. For example, the transceiver 816 may include a quadrature up-converter and/or a digital to analog converter (DAC) that may be configured to modify the baseband signal. Alternatively, or additionally, the transceiver 816 may include a direct RF sampling converter that may be configured to modify the baseband signal.

In some examples, the digital transmitter 802 may be configured to obtain a baseband signal via connection 810. In some examples, the digital transmitter 802 may be configured to up-convert the baseband signal. For example, the digital transmitter 802 may include a quadrature up-converter to apply to the baseband signal. In some examples, the digital transmitter 802 may include an integrated digital to analog converter (DAC). The DAC may convert the baseband signal to an analog signal, or a continuous time signal. In some examples, the DAC architecture may include a direct RF sampling DAC. In some examples, the DAC may be a separate element from the digital transmitter 802.

In some examples, the transceiver 816 may include one or more subcomponents that may be used in preparing the baseband signal and/or transmitting the baseband signal. For example, the transceiver 816 may include an RF front end (e.g., in a wireless environment) which may include a power amplifier (PA), a digital transmitter (e.g., 802), a digital front end, an institute of electrical and electronics engineers (IEEE) 1588v2 device, a Long-Term Evolution (LTE) physical layer (L-PHY), an (S-plane) device, a management plane (M-plane) device, an Ethernet media access control (MAC)/personal communications service (PCS), a resource controller/scheduler, and the like. In some examples, a radio (e.g., a radio frequency circuit 804) of the transceiver 816 may be synchronized with the resource controller via the S-plane device, which may contribute to high-accuracy timing with respect to a reference clock.

In some examples, the transceiver 816 may be configured to obtain the baseband signal for transmission. For example, the transceiver 816 may receive the baseband signal from a separate device, such as a signal generator. For example, the baseband signal may come from a transducer configured to convert a variable into an electrical signal, such as an audio signal output of a microphone picking up a speaker's voice. Alternatively, or additionally, the transceiver 816 may be configured to generate a baseband signal for transmission. In these and other examples, the transceiver 816 may be configured to transmit the baseband signal to another device, such as the device 814.

In some examples, the device 814 may be configured to receive a transmission from the transceiver 816. For example, the transceiver 816 may be configured to transmit a baseband signal to the device 814.

In some examples, the radio frequency circuit 804 may be configured to transmit the digital signal received from the digital transmitter 802. In some examples, the radio frequency circuit 804 may be configured to transmit the digital signal to the device 814 and/or the digital receiver 806. In some examples, the digital receiver 806 may be configured to receive a digital signal from the RF circuit and/or send a digital signal to the processing device 808.

In some examples, the processing device 808 may be a standalone device or system, as illustrated. Alternatively, or additionally, the processing device 808 may be a component of another device and/or system. For example, in some examples, the processing device 808 may be included in the transceiver 816. In instances in which the processing device 808 is a standalone device or system, the processing device 808 may be configured to communicate with additional devices and/or systems remote from the processing device 808, such as the transceiver 816 and/or the device 814. For example, the processing device 808 may be configured to send and/or receive transmissions from the transceiver 816 and/or the device 814. In some examples, the processing device 808 may be combined with other elements of the communication system 800.

FIG. 9 illustrates a diagrammatic representation of a machine in the example form of a computing device 900 within which a set of instructions, for causing the machine to perform any one or more of the methods discussed herein, may be executed. The computing system may be configured to implement or direct one or more operations associated with AP interference reduction. The computing device 900 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative examples, the machine may be connected (e.g., networked) to other machines in a local area network (LAN), an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 900 includes a processing device (e.g., a processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 916, which communicate via a bus 908.

Processing device 902 represents one or more general-purpose processing devices such as a microprocessor, central processing unit, or the like. More particularly, the processing device 902 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also include one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computing device 900 may further include a network interface device 922 which may communicate with a network 918. The computing device 900 also may include a display device 910 (e.g., a liquid crystal display (LCD) or a cathode ray tube (CRT)), an alphanumeric input device 912 (e.g., a keyboard), a cursor control device 914 (e.g., a mouse) and a signal generation device 920 (e.g., a speaker). In at least one example, the display device 910, the alphanumeric input device 912, and the cursor control device 914 may be combined into a single component or device (e.g., an LCD touch screen).

The data storage device 916 may include a computer-readable storage medium 924 on which is stored one or more sets of instructions 926 embodying any one or more of the methods or functions described herein. The instructions 926 may also reside, completely or at least partially, within the main memory 904 and/or within the processing device 902 during execution thereof by the computing device 900, the main memory 904 and the processing device 902 also constituting computer-readable media. The instructions may further be transmitted or received over a network 918 via the network interface device 922.

While the computer-readable storage medium 924 is shown in an example to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

EXAMPLES

The following provide examples according to the present disclosure.

Example 1: Tone Rotation Performance

Figure 10A:
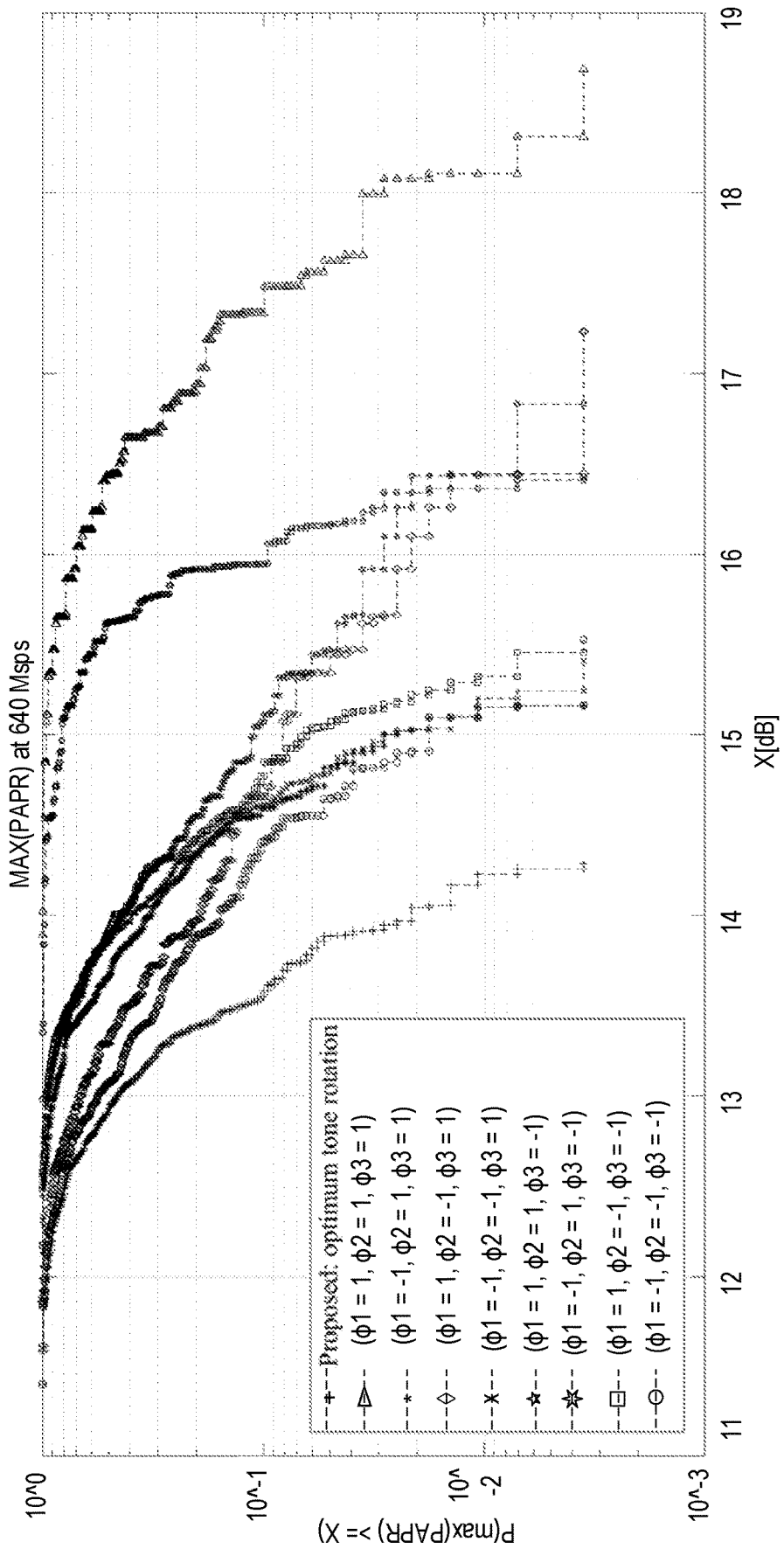
FIG. 10A illustrates maximum peak to average power ratio (PAPR) for tone rotation selection compared to different combinations of fixed tone rotation.

FIGS. 10A illustrated that the proposed tone rotation method outperformed the eight possible combinations of the fixed tone rotation and the gain reached up to 5 dB. The performance enhancement resulted from exploiting the preamble puncturing information to optimize (or enhance) the selected tone rotation which minimized (or reduced) the PAPR.

Figure 10B:
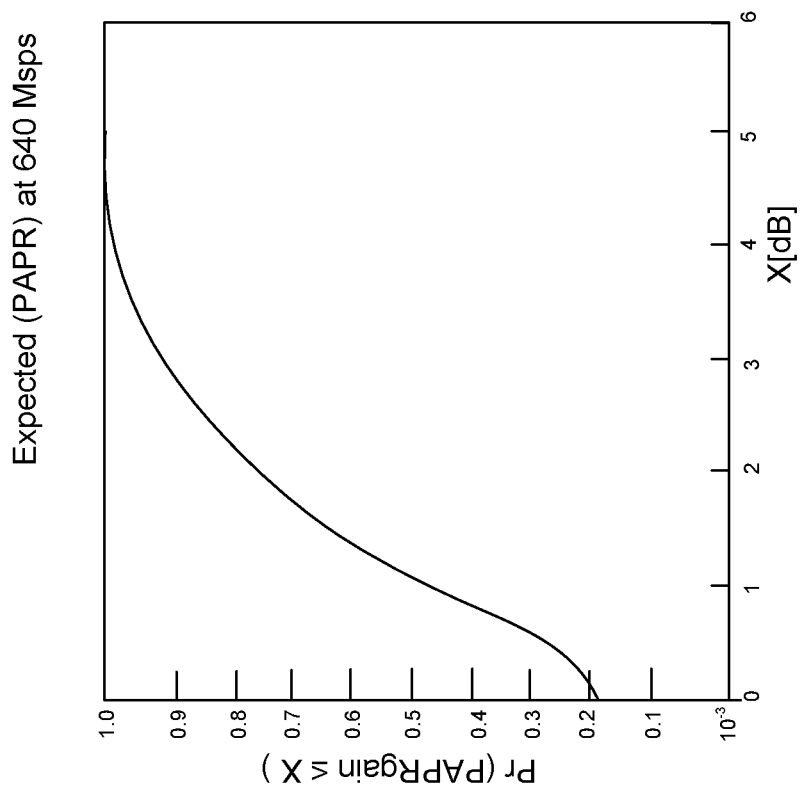
FIG. 10B illustrates expected PAPR gain in dB for tone rotation selection compared to a fixed tone rotation.

FIG. 10B illustrated that the proposed tone rotation method outperformed the fixed tone rotation ($\phi_{1=1}$, $\phi_{2=-1}$, $\phi_{3=-1}$).

Example 2: Interpolation Effect

Figure 11:
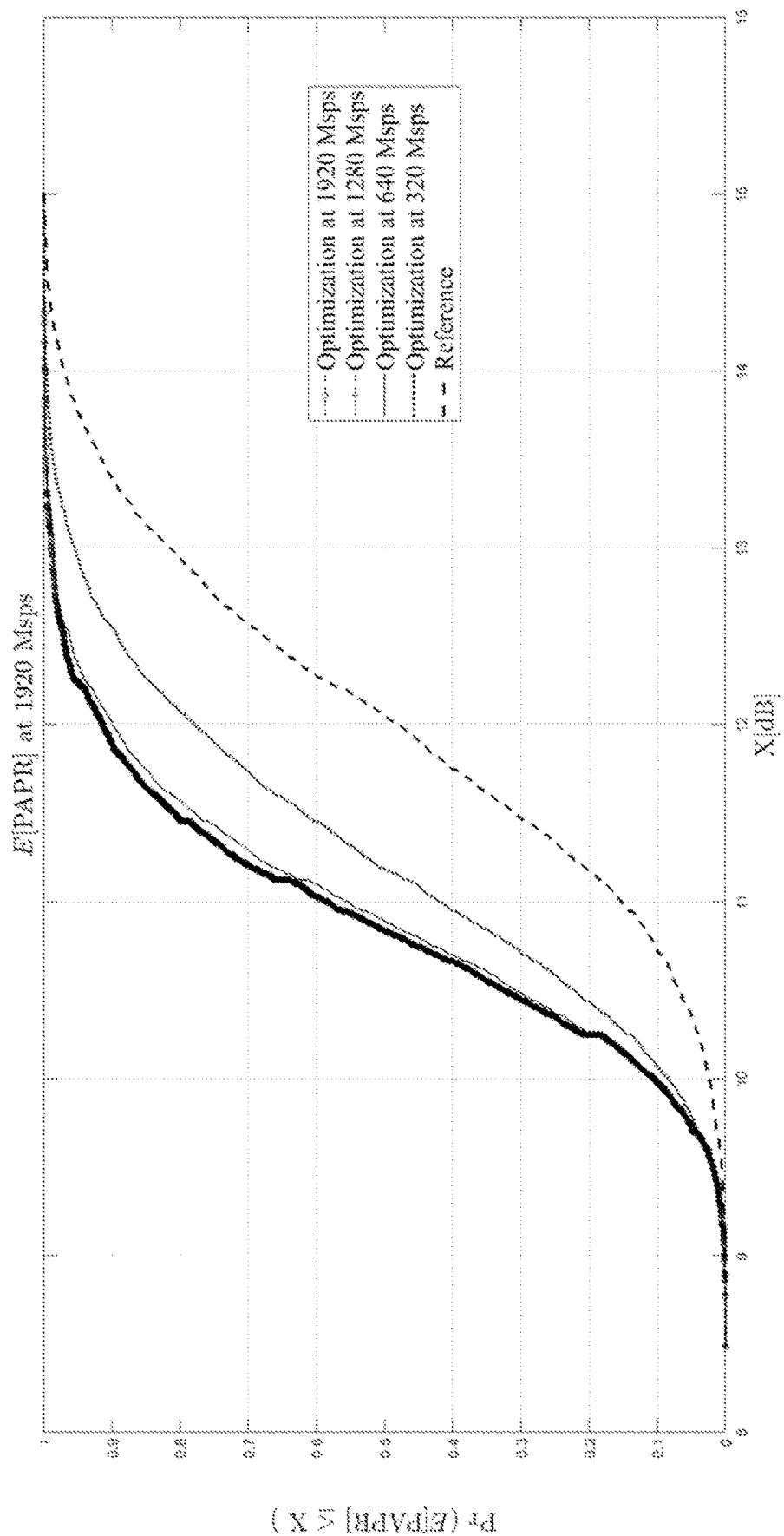
FIG. 11 illustrates expected PAPR in dB for tone rotation selection compared to a fixed tone rotation.

FIGS. 11 illustrated that optimization at 640 Msps attained enhanced performance with much lower computational complexity than optimization at 1920 Msps and optimization at 1280 Msps when compared to the reference.

In some examples, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An access point, comprising:
a processing device configured to:
identify a puncturing pattern for a channel width of a physical layer protocol data unit (PPDU) of a transmit signal;
compute one or more tone rotation patterns using one or more tone rotation pattern parameters;
compute a selection matrix based on the puncturing pattern; and
select a tone rotation pattern of the one or more tone rotation patterns based on the selection matrix to minimize a peak to average power ratio (PAPR) of the transmit signal;
a transceiver configured to transmit the transmit signal to a wireless device based on the tone rotation pattern.

2. The access point of claim 1, wherein the processing device is further configured to:
minimize the PAPR of the transmit signal based on the selection matrix and the one or more tone rotation pattern parameters.

3. The access point of claim 1, wherein the processing device is further configured to:
compute, using a projection of the one or more tone rotation patterns on the selection matrix, one or more projection vectors for one or more tone rotation patterns based on the puncturing pattern.

4. The access point of claim 1, wherein the one or more tone rotation pattern parameters are based on an 80 MHz sub-block rotation coefficient.

5. The access point of claim 1, wherein the processing device is further configured to:
determine maximum values for one or more projection vectors;
determine minimized maximum values for the one or more projection vectors; and select a tone rotation based on the minimized maximum values.

6. The access point of claim 1, wherein the processing device is further configured to update the tone rotation pattern based on one or more of:
receiving an updated puncturing pattern,
a random variable, or
a selected interval.

7. The access point of claim 1, wherein one or more of:
the access point is configured to transmit using one or more of extremely high throughput (EHT) or non-high-throughput (HT) transmission, or
the PPDU comprises one or more modulated fields comprising one or more of: legacy short training field (L-STF), legacy long training field (L-LTF), legacy signal field (L-SIG), repeated L-SIG (RL-SIG), universal signal field (U-SIG), EHT-SIG, or
the channel width is 320 MHZ, or
the tone rotation pattern is a phase rotation pattern, or
the transmit signal is transmitted as a duplicate transmission, or
the transmit signal is transmitted using multi-user orthogonal frequency-division multiple access (OFDMA).

8. A station (STA), comprising:
a processing device configured to:
identify a puncturing pattern for a channel width of a physical layer protocol data unit (PPDU) of a transmit signal;
compute one or more tone rotation patterns using one or more tone rotation pattern parameters;
compute a selection matrix based on the puncturing pattern; and
select a tone rotation pattern based on the selection matrix to minimize a peak to average power ratio (PAPR) of the transmit signal;
a transceiver configured to transmit the transmit signal to a wireless device based on the tone rotation pattern.

9. The STA of claim 8, wherein the processing device is further configured to:
minimize the PAPR of the transmit signal based on the selection matrix and the one or more tone rotation pattern parameters.

10. The STA of claim 8, wherein the processing device is further configured to:
compute, using a projection of the one or more tone rotation patterns on the selection matrix, one or more projection vectors for one or more tone rotation patterns based on the puncturing pattern.

11. The STA of claim 8, wherein the one or more tone rotation pattern parameters are based on an 80 MHz sub-block rotation coefficient.

12. The STA of claim 8, wherein the processing device is further configured to:
determine maximum values for one or more projection vectors;
determine minimized maximum values for the one or more projection vectors; and
select a tone rotation based on the minimized maximum values.

13. The STA of claim 8, wherein the processing device is further configured to update the tone rotation pattern based on one or more of:
receiving an updated puncturing pattern,
a random variable, or
a selected interval.

14. The STA of claim 8, wherein one or more of:
the STA is configured to transmit using one or more of extremely high throughput (EHT) or non-high-throughput (HT) transmission, or
the PPDU comprises one or more modulated fields comprising one or more of: legacy short training field (L-STF), legacy long training field (L-LTF), legacy signal field (L-SIG), repeated L-SIG (RL-SIG), universal signal field (U-SIG), EHT-SIG, or
the channel width is 320 MHz, or
the tone rotation pattern is a phase rotation pattern, or
the transmit signal is transmitted as a duplicate transmission, or
the transmit signal is transmitted using multi-user orthogonal frequency-division multiple access (OFDMA).

* * * * *